(12) United States Patent
Horinouchi et al.

(10) Patent No.: US 10,823,684 B2
(45) Date of Patent: Nov. 3, 2020

(54) X-RAY DETECTOR AND X-RAY CT APPARATUS

(71) Applicant: CANON MEDICAL SYSTEMS CORPORATION, Otawara-shi (JP)

(72) Inventors: Minoru Horinouchi, Otawara (JP); Akira Nishijima, Nasushiobara (JP)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 16/504,089

(22) Filed: Jul. 5, 2019

(65) Prior Publication Data

US 2020/0011813 A1    Jan. 9, 2020

(30) Foreign Application Priority Data

Jul. 9, 2018   (JP) ................................ 2018-130217

(51) Int. Cl.
*G01N 23/046*   (2018.01)

(52) U.S. Cl.
CPC ..... *G01N 23/046* (2013.01); *G01N 2223/308* (2013.01); *G01N 2223/3103* (2013.01); *G01N 2223/313* (2013.01); *G01N 2223/505* (2013.01)

(58) Field of Classification Search
CPC ....... G01N 2223/308; G01N 2223/313; G01N 2223/505; G01N 23/046
See application file for complete search history.

(56) References Cited

U.S. PATENT DOCUMENTS

2006/0231767 A1    10/2006  Danzer et al.
2008/0231849 A1*   9/2008   Myrick ................. G01N 21/45
                                              356/300

FOREIGN PATENT DOCUMENTS

JP    10-146332    6/1998
JP    2006-276016  10/2006

* cited by examiner

*Primary Examiner* — Don K Wong
(74) *Attorney, Agent, or Firm* — Oblon, McClelland, Maier & Neustadt, L.L.P.

(57) ABSTRACT

An X-ray detector according to a present embodiment includes: an optical sensor array configured to generate an electric signal by receiving X-rays; a substrate including at least an element that performs A/D conversion on the electric signal; a first support plate configured to hold a separator for removing scattered radiation; and a second support plate that is formed of a material being higher in thermal conductivity than the first support plate and is provided in contact with the substrate at least in part.

12 Claims, 4 Drawing Sheets

X-RAY DETECTOR AND X-RAY CT APPARATUS

CROSS-REFERENCE TO RELATED APPLICATIONS

This application claims the benefit of priority of Japanese Patent Application No. 2018-130217, filed Jul. 9, 2018, the entire contents of which are incorporated herein by reference.

FIELD

Embodiments described herein relate generally to an X-ray detector and an X-ray CT apparatus.

BACKGROUND

In an X-ray detector used for an X-ray type diagnosis apparatus such as an X-ray CT apparatus, X-rays radiated from an X-ray tube are converted into visible light through scintillators and the visible light is converted into electrical signals by an optical sensor array. The detected electrical signals are transmitted to a data acquisition unit provided outside the X-ray detector, then are subjected to data processing such as A/D (analogue to digital), and then are stored as imaging data.

In some cases, hardware such as an ASIC (Application Specific Integrated Circuit) is mounted on a substrate of an X-ray detector equipped with an optical sensor array, and data processing such as A/D conversion is executed in this substrate in addition to processing of converting visible light into electrical signals. In this type of detector, the circuit in the substrate generates heat in some cases. When the generated heat remains in the substrate, the substrate temperature exceeds the upper limit at which the circuit operation is ensured, and consequently, the circuit may not operate properly.

DETAILED DESCRIPTION

Hereinafter, X-ray detectors and X-ray CT apparatuses of respective embodiments will be described by referring to the accompanying drawings.

An X-ray detector according to a present embodiment includes: an optical sensor array configured to generate an electric signal by receiving X-rays; a substrate including at least an element that performs A/D conversion on the electric signal; a first support plate configured to hold a separator for removing scattered radiation; and a second support plate that is formed of a material being higher in thermal conductivity than the first support plate and is provided in contact with the substrate at least in part.

First, the overall configuration of an X-ray CT apparatus 1 according to the present embodiment will be described.

Figure 1:
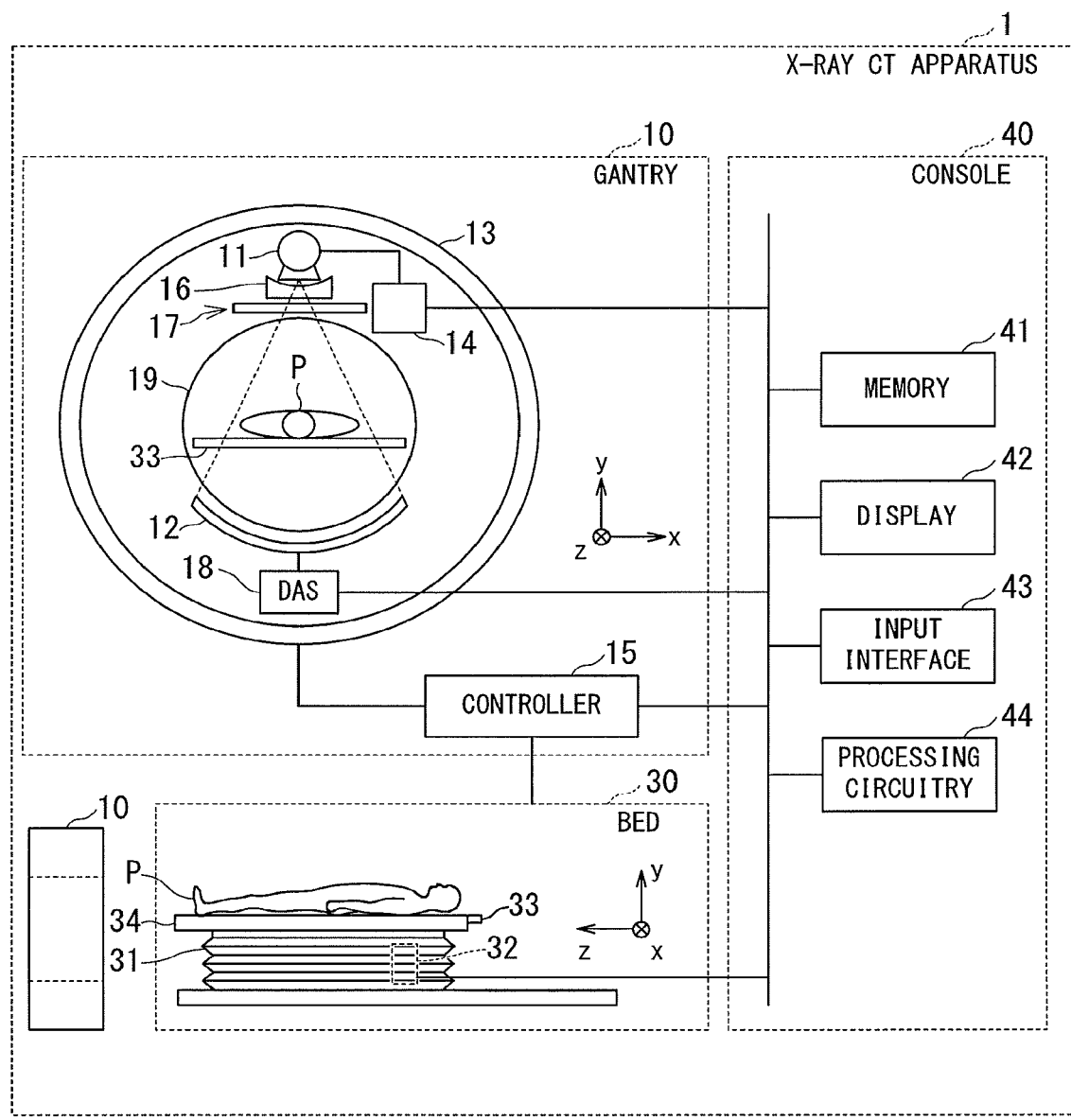
FIG. 1 is a block diagram illustrating a configuration of an X-ray CT apparatus according to a present embodiment.

As shown in FIG. 1, the X-ray CT apparatus 1 includes a gantry 10, a bed 30, and a console 40.

Although two gantries 10 are illustrated in FIG. 1 in order to describe the positional relationship between respective components of the gantry 10 and an object P inserted into the gantry 10, the actual number of the gantry 10 is one.

The gantry 10 includes an X-ray tube 11, an X-ray detector 12, a rotating frame 13, a high-voltage power supply 14, a wedge 16, and a diaphragm 17, and a DAS (data acquisition unit) 18.

The X-ray tube 11 is a vacuum tube that uses high voltage applied by the high-voltage power supply 14 for radiating thermoelectrons from its cathode (i.e., filament) to its anode (i.e., target) so as to generate X-rays.

The wedge 16 is a filter for adjusting the amount of X-rays radiated from the X-ray tube 11. Specifically, the wedge 16 is a filter configured to transmit and attenuate the X-rays radiated from the X-ray tube 11 such that the X-rays radiated onto the object P from the X-ray tube 11 have predetermined distribution. For instance, the wedge 16(i.e., wedge filter or bow-tie filter) is a filter in which aluminum is processed to have a predetermined target angle or a predetermined thickness.

The diaphragm 17 is, e.g., a lead plate for narrowing the irradiation range of X-rays transmitted through the wedge 16 and forms a slit by a combination of plural lead blades.

The high-voltage power supply 14 includes electric circuits such as a transformer and a rectifier in addition to a high-voltage generator and an X-ray controller. The high-voltage generator has a function of generating a high voltage to be applied to the X-ray tube 11, and the X-ray controller controls the output voltage according to X-rays radiated from the X-ray tube 11. The high-voltage power supply 14 may be a transformer type or an inverter type. The high-voltage power supply 14 may be provided on the rotating frame 13 or on the side of a non-illustrated fixed frame of the gantry 10. The fixed frame is a frame that rotatably supports the rotating frame 13.

The X-ray detector 12 detects X-rays that have been radiated from the X-ray tube 11 and have passed through the object P, and outputs an electric signal corresponding to the detected amount of X-rays to the DAS 18. For instance, the X-ray detector 12 includes plural X-ray detection element rows in which plural X-ray detection elements are arrayed in the channel direction along one circular arc centering on the focal point of the X-ray tube 11. The detailed configuration of the X-ray detector 12 will be described below.

The DAS 18 includes an amplifier configured to perform amplification processing on electric signals outputted from the respective X-ray detection elements of the X-ray detector 12 and an A/D converter configured to convert the electric signals into digital signals, and generates detection data. The detection data generated by the DAS 18 are transferred to the console 40. When data processing such as A/D conversion is performed in the substrate 24 (FIG. 3A) of the X-ray detector 12, some functions of the DAS 18 can be omitted.

The rotating frame 13 is an annular frame configured to support the X-ray tube 11 and the X-ray detector 12 such that both face each other, and integrally rotates the pair of the X-ray tube 11 and the X-ray detector 12 under the control of the controller 15 described below. In addition to the X-ray tube 11 and the X-ray detector 12, the rotating frame 13 further includes and supports the high-voltage power supply 14 and the DAS 18.

The detection data generated by the DAS 18 are transmitted by optical communication from a transmitter having an LED (light emitting diode) provided in the rotating frame 13 to a receiver having a photodiode provided in the non-rotating portion of the gantry 10 (e.g., the above-described fixed frame which is not shown in FIG. 1), and then are transferred to the console 40. The transmission method of the detection data from the rotating frame 13 to the non-rotating portion of the gantry 10 is not limited to the above-described optical communication. Any method may be adopted for this transmission method as long as it is non-contact type data transmission.

The controller 15 includes processing circuitry equipped with components such as a CPU (Central Processing Unit) and a driving mechanism such as a motor and an actuator. The controller 15 receives an input signal from an input interface 43 attached to the console 40 or the gantry 10, and has a function of controlling respective operations of the gantry 10 and the bed 30.

For instance, the controller 15 controls rotation of the rotating frame 13 in response to the input signal, performs tilt control of the gantry 10, and controls driving of the bed 30 and its table 33.

In the present embodiment, three axes of the apparatus coordinate system are defined as follows. The rotational axis of the rotating frame 13 in the non-tilted state, i.e., the longitudinal direction of the table 33 of the bed 30 is defined as the z-axis direction. The direction orthogonal to the z-axis and parallel to the floor surface is defined as the x-axis direction. The direction orthogonal to both of the z-axis and the x-axis, i.e., the direction perpendicular to the floor surface is defined as the y-axis direction.

The controller 15 performs tilt control of the gantry 10 by rotating the rotating frame 13 around the axis parallel to the x-axis direction on the basis of the tilt angle information inputted from the input interface 43 that is attached to the gantry 10. The controller 15 may be provided in the gantry 10 or may be provided in the console 40.

The bed 30 is a device for placing and moving the object P as a scanning target, and includes a base 31, a bed driver 32, the above-described table 33, and a support frame 34. The base 31 is a housing that movably supports the support frame 34 in the vertical direction (i.e., y-axis direction). The bed driver 32 is a motor or an actuator that moves the table 33, on which the object P is placed, in the longitudinal direction of the table 33 (i.e., z-axis direction). The table 33 provided on the upper surface of the support frame 34 is a plate on which the object P is placed. In addition to the table 33, the bed driver 32 may move the support frame 34 in the longitudinal direction of the table 33.

The console 40 includes a memory 41, a display 42, the above-described input interface 43, and processing circuitry 44. Although the console 40 is described separately from the gantry 10, the gantry 10 may include the entirety of the console 40 or may include one or some components of the console 40.

The memory 41 is configured of, e.g., a random access memory (RAM), a hard disk, an optical disk, and a semiconductor memory device such as a flash memory. The memory 41 stores, e.g., projection data and reconstructed image data.

The display 42 displays various types of information. For instance, the display 42 outputs a medical image (e.g., CT image) generated by the processing circuitry 44, a GUI (Graphical User Interface) for receiving various operations from a user. For instance, the display 42 is a liquid crystal display or a CRT (Cathode Ray Tube) display. The display 42 may be provided in the gantry 10. Further, the display 42 may be a desktop type or may be configured of a tablet terminal that can wirelessly communicate with the console 40.

The input interface 43 receives various input operations from a user, converts the received input operations into electric signals, and outputs them to the processing circuitry 44. For instance, the input interface 43 receives various conditions related to imaging from the user, and the various conditions include, e.g., scanning conditions for acquiring projection data, reconstruction conditions for reconstructing a CT image, and image processing conditions for generating a post-processing image from the CT image. For instance, the input interface 43 is composed of a mouse, a keyboard, a trackball, a switch, a button, and/or a joystick.

In addition, the input interface 43 may be provided in the gantry 10. Further, the input interface 43 may be configured of a tablet terminal that can wirelessly communicate with the console 40.

The processing circuitry 44 controls various functions of the processing circuitry 44 on the basis of the input operation received from a user via the input interface 43. For instance, the processing circuitry 44 generates data obtained by performing preprocessing on the outputted detection data, and the preprocessing includes, e.g., logarithmic conversion processing, offset correction processing, sensitivity correction processing between channels, and beam hardening correction. The processing circuitry 44 performs reconstruction processing using an FBP (Filtered Back Projection) method and/or an IR (Iterative Reconstruction) method on the generated data so as to generate CT image data.

Next, the X-ray detector 12 according to the embodiment will be described.

Figure 2:
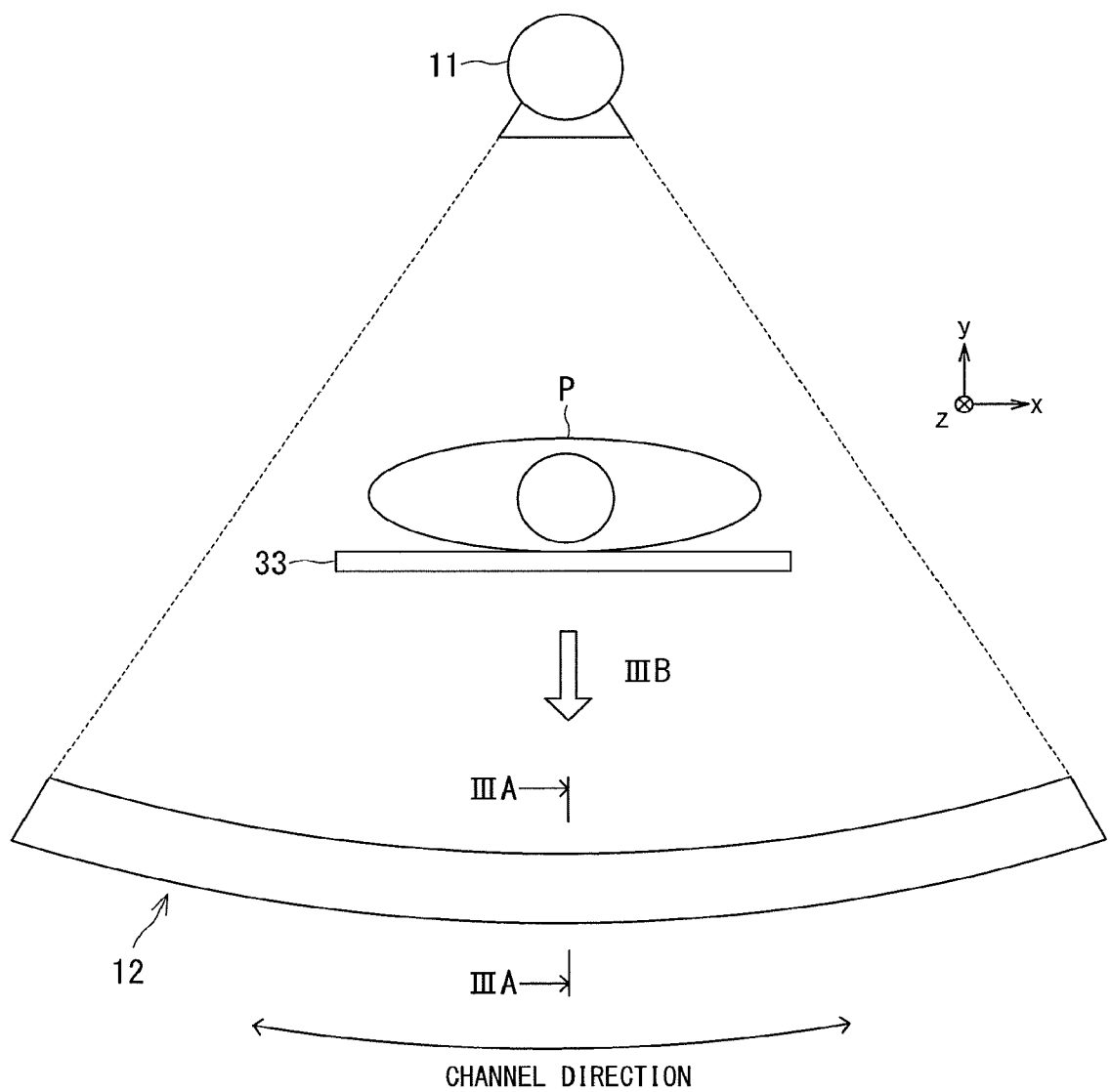
FIG. 2 is a schematic diagram illustrating the positional relationship between the X-ray tube and the X-ray detector.

FIG. 2 is a schematic diagram illustrating the positional relationship between the X-ray tube 11 and the X-ray detector 12. In the following description, the direction along the arc of the X-ray detector 12 is defined as the channel direction. Further, the direction orthogonal to the channel direction and parallel to the moving direction of the table 33 in its longitudinal direction is defined as the slice direction, and the slice direction is the same as the z-axis direction in the present embodiment.

Figure 3A:
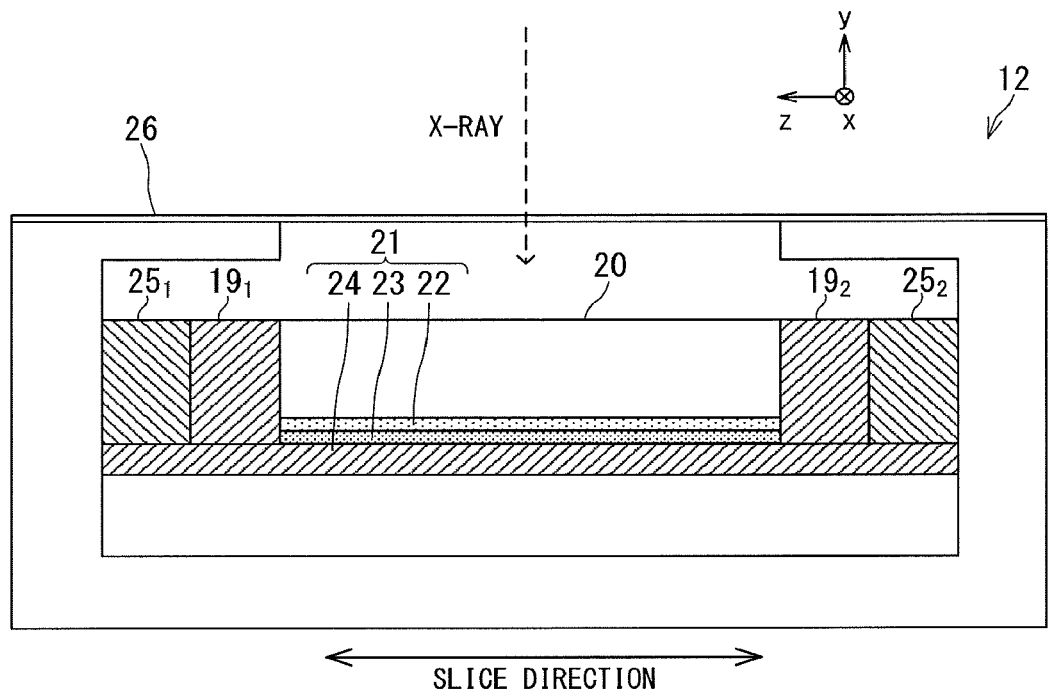
FIG. 3A is a longitudinal cross-sectional view of the X-ray detector according to the embodiment, taken along the line IIIA-IIIA of FIG. 2.

FIG. 3A is a longitudinal cross-sectional view of the X-ray detector 12 according to the embodiment, taken along the line IIIA-IIIA of FIG. 2.

Figure 3B:
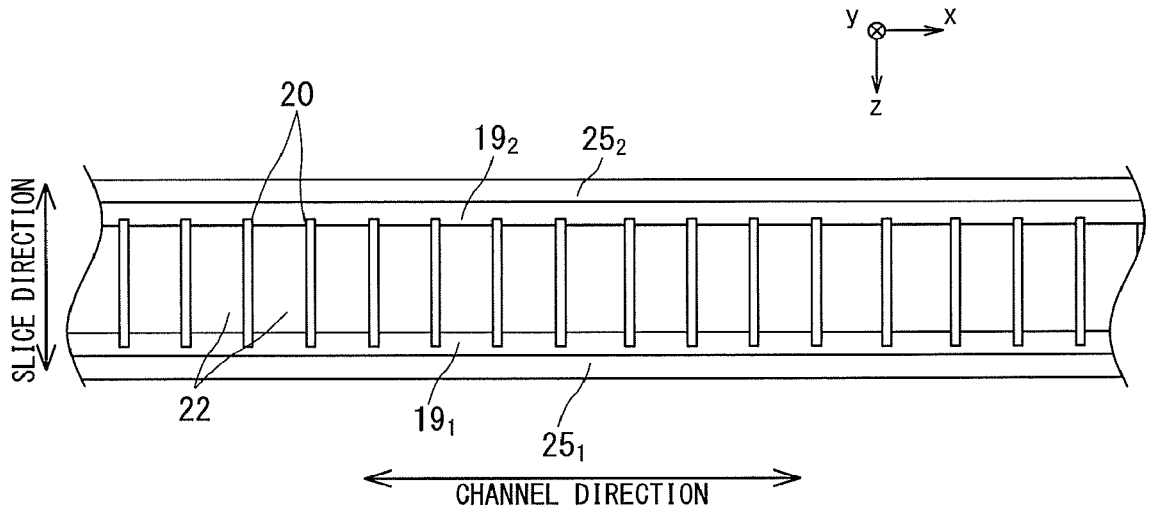
FIG. 3B is a top view when the X-ray detector is viewed from the arrow direction IIIB described in FIG. 2.

FIG. 3B is a top view when the X-ray detector 12 is viewed from the arrow direction IIIB described in FIG. 2. In FIG. 3B, a holding container 26 is not shown in order to clearly show internal configuration of the holding container 26.

The X-ray detector 12 includes a first support plate 19, a separator 20, X-ray detection elements 21, scintillators 22 and a second support plate 25.

The first support plate 19 is composed of a pair of plates $19_1$ and $19_2$ that are the same in size and disposed so as to face each other. The plate $19_1$ is provided with plural grooves and the plate $19_2$ is also provided with plural grooves at the same positions as the grooves of the plate $19_1$ so that each of the separators 20 is partially inserted into one groove of the plate $19_1$ on its one end side and is partially inserted into one groove of plate $19_2$ on the other end side. In this manner, the first support plate 19 holds the plural separators 20 in parallel with the slice direction. From the viewpoint of forming grooves for holding the separators 20 that are thin plates, the first support plate 19 is made of a material such as a glass epoxy material that is easy to form.

Each of the separators 20 is formed of a material that absorbs X-rays, such as molybdenum, and is a shielding material for removing scattered X-rays emitted from the X-ray tube 11. The first support plate 19 and the separators 20 constitute a collimator.

Each of the X-ray detection elements 21 is composed of the scintillator 22, the optical sensor array 23, and a part of the substrate 24. The X-ray detection element 21 is housed in the holding container 26 that is a housing formed of metal such as aluminum.

Each of the scintillators 22 is a member that converts radiated X-rays into light, and is arranged on the substrate 24. The scintillators 22 are configured as an array of plural scintillators, and each of the scintillators 22 has a scintillator crystal that outputs light of photon quantity according to incident X-ray dose.

The optical sensor array 23 is an element that converts visible light, which is generated by each scintillator 22 from the radiated X-rays, into an electrical signal. The optical sensor array 23 has a function of converting visible light into an electrical signal according to the amount of light from the scintillator 22. For instance, the optical sensor array 23 is exemplified by an optical sensor such as a photodiode. The X-ray detector 12 is not limited to the indirect conversion detector that converts X-rays into visible light and then converts the visible light into an electrical signal through the scintillators as in the embodiment. The X-ray detector 12 may be a direct conversion detector having semiconductor elements, each of which directly converts incident X-rays into an electrical signal.

The substrate 24 includes at least an element that performs A/D conversion of an electric signal generated by the optical sensor array 23. On the substrate 24, a hardware circuit such as an ASIC for performing data processing such as A/D conversion on an electric signal is mounted. The optical sensor array 23 (disposed immediately below the scintillator 22) and the substrate 24 are integrally configured, and the scintillator 22 is disposed on the substrate 24 (more precisely, on the optical sensor array 23). The substrate 24 is connected to and fixed to at least one of the first support plate 19 and the second support plate 25.

The circuit in the substrate 24 may execute data processing such as A/D conversion of electric signals generated by the optical sensor array 23. Additionally, the functions to be performed may be divided and processed between the substrate 24 and the DAS 18. Since A/D conversion is performed at a position close to the optical sensor array 23, circuit noise caused by transmission can be suppressed.

The second support plate 25 is composed of a pair of plates $25_1$ and $25_2$ that are the same in size. The second support plate 25 ($25_1$ and $25_2$) is formed of a material having a thermal conductivity higher than that of the first support plate 19, and is provided in contact with the substrate 24 at least in part. The second support plate 25 is formed of a material having a satisfactory thermal conductivity such as metal, e.g., a metal material such as iron.

Specifically, the two plate $25_1$ and $25_2$ of the second support plate 25 are disposed so as to face each other on the outside of the first support plate 19 and disposed in contact with the substrate 24 on its bottom surface.

The second support plate 25 is arranged such that the outer side surface of each of the plates $25_1$ and $25_2$ is in contact with the inner surface of the holding container 26. Further, the inner side surface of the plate $25_1$ is in contact with the side surface of the plate $19_1$ of the first support plate 19 and the inner side surface of the plate $25_2$ is in contact with the side surface of the plate $19_2$ of the first support plate 19.

Since the substrate 24 of the X-ray detection elements 21 are brought into contact with the second support plate 25, the heat generated in the substrate 24 is transmitted to the second support plate 25 and discharged. Further, heat is diffused to the holding container 26 by the contact between the second support plate 25 and the holding container 26.

The X-ray detector 12 may have a structure in which plural X-ray detection element rows composed of plural X-ray detection elements 21 arrayed in the channel direction are arrayed in the slice direction.

Figure 4:
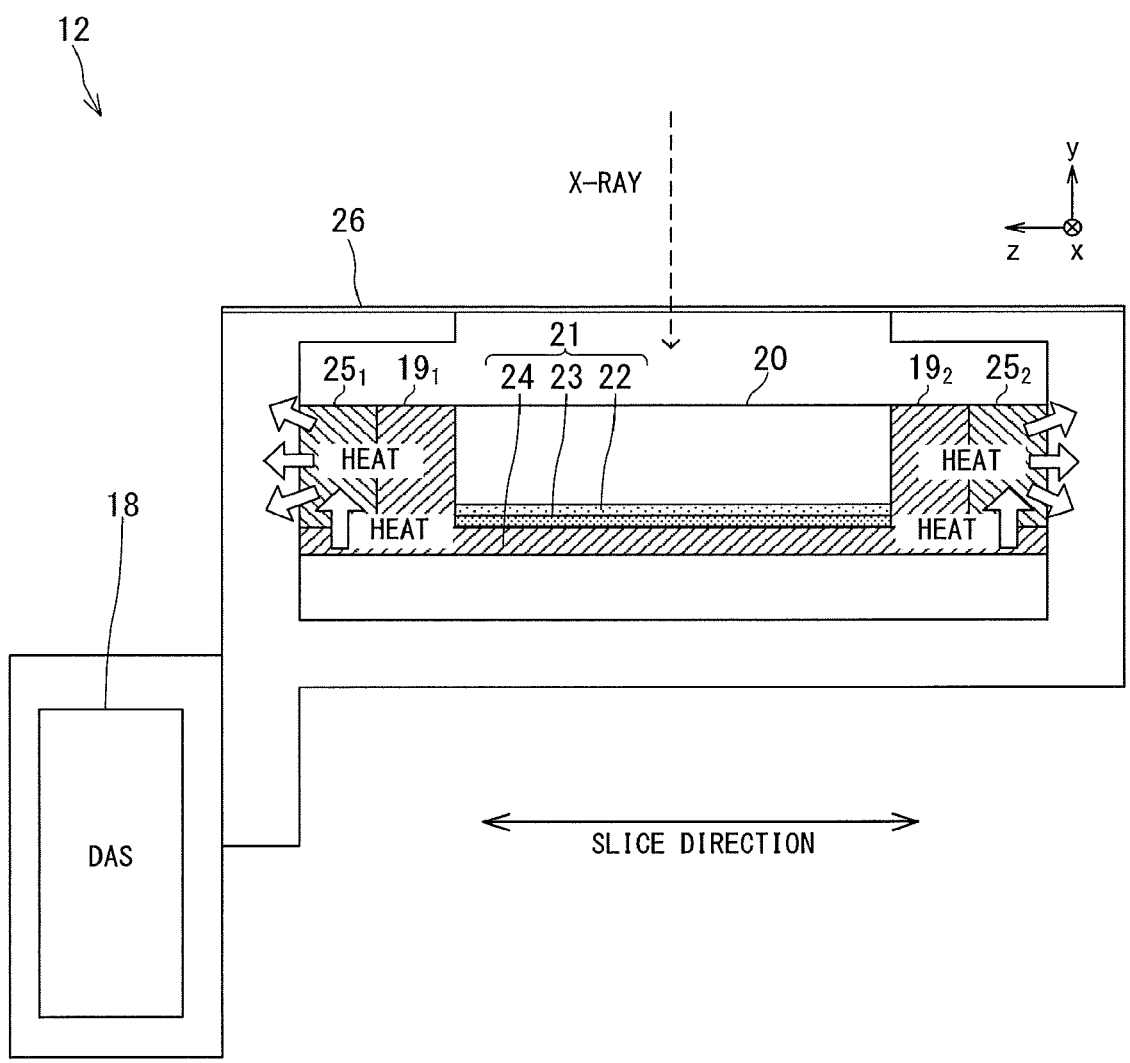
FIG. 4 is a schematic diagram illustrating how heat generated in the substrate of the X-ray detector according to the embodiment is discharged.

FIG. 4 is a schematic diagram illustrating how heat generated in the substrate 24 of the X-ray detector 12 according to the embodiment is discharged. The arrows in the figure indicate the flow until the heat generated in the substrate 24 is discharged to the outside.

The heat generated in the substrate 24 is transferred to the second support plate 25. Afterward, the heat is diffused to the holding container 26 through the second support plate 25 and is discharged to the outside of the X-ray detector 12.

The holding container 26 may be provided with, e.g., a heat sink in which plural protrusions protruding to the side of outside air are formed. Thereby the surface area in contact with the outside air is increased and the heat is more efficiently discharged by air cooling to the outside of the X-ray detector 12.

Since the heat generated in the substrate 24 of the X-ray detector 12 is diffused to the holding container 26 through the second support plate 25 as described above, the heat retention in the substrate 24 can be suppressed and the heat can be efficiently discharged to the outside. Thus, even when hardware such as an ASIC for A/D conversion is mounted on the substrate 24 of the X-ray detector, the substrate temperature can be maintained below the operation guarantee temperature of the hardware and the operation of the circuit can be stably maintained.

As compared with the case of using a cooling mechanism such as a heat pipe or a Peltier element, cooling of the elements of the X-ray detector can be achieved with a simple structure and at low cost. When a mechanical cooling mechanism such as a cooling fan is applied to an X-ray CT apparatus, there is a possibility that the cooling mechanism fails due to the influence of gravity in association with high-speed rotation. However, in the X-ray detector of the present embodiment, the substrate of the X-ray detector can be cooled stably.

According to at least one embodiment described above, the heat generated in the substrate of the detector can be simply and efficiently discharged to the outside.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. An X-ray detector comprising:
an optical sensor array configured to generate an electric signal by receiving X-rays;

a substrate including at least an element that performs A/D conversion on the electric signal;

a first support plate configured to hold a separator for removing scattered radiation; and a second support plate that is formed of a material being higher in thermal conductivity than the first support plate and is provided in contact with the substrate at least in part.

2. The X-ray detector according to claim 1, wherein the second support plate is disposed outside the first support plate in such a manner that a bottom surface of the second support plate is in contact with the substrate.

3. The X-ray detector according to claim 1, wherein the second support plate is provided in contact with a holding container for accommodating the substrate and is configured to diffuse heat generated in the substrate to the holding container.

4. The X-ray detector according to claim 2, wherein the second support plate is provided in contact with a holding container for accommodating the substrate and is configured to diffuse heat generated in the substrate to the holding container.

5. The X-ray detector according to claim 3, wherein the holding container includes a heat sink that increases surface area in contact with outside air.

6. The X-ray detector according to claim 4, wherein the holding container includes a heat sink that increases surface area in contact with outside air.

7. An X-ray CT apparatus comprising:

an X-ray tube configured to radiate X-rays;

an X-ray detector including: an optical sensor array configured to generate an electric signal by receiving the X-rays; a substrate including at least an element that performs A/D conversion on the electric signal; a first support plate configured to hold a separator for removing scattered radiation; and a second support plate that is formed of a material being higher in thermal conductivity than the first support plate and is provided in contact with the substrate at least in part; and a rotating frame configured to integrally support and rotate the X-ray tube and the X-ray detector in such a manner that the X-ray tube and the X-ray detector face each other.

8. The X-ray CT apparatus according to claim 7, wherein the second support plate of the X-ray detector is disposed outside the first support plate in such a manner that a bottom surface of the second support plate is in contact with the substrate.

9. The X-ray CT apparatus according to claim 7, wherein the second support plate of the X-ray detector is provided in contact with a holding container for accommodating the substrate and is configured to diffuse heat generated in the substrate to the holding container.

10. The X-ray CT apparatus according to claim 8, wherein the second support plate of the X-ray detector is provided in contact with a holding container for accommodating the substrate and is configured to diffuse heat generated in the substrate to the holding container.

11. The X-ray CT apparatus according to claim 9, wherein the holding container of the X-ray detector includes a heat sink that increases surface area in contact with outside air.

12. The X-ray CT apparatus according to claim 10, wherein the holding container of the X-ray detector includes a heat sink that increases surface area in contact with outside air.

* * * * *